(12) United States Patent
Tseng et al.

(10) Patent No.: US 12,451,135 B2
(45) Date of Patent: Oct. 21, 2025

(54) CONTEXT-AWARE FALSE TRIGGER MITIGATION FOR AUTOMATIC SPEECH RECOGNITION (ASR) SYSTEMS OR OTHER SYSTEMS

(71) Applicant: Samsung Electronics Co., Ltd., Suwon-si (KR)

(72) Inventors: Cindy Sushen Tseng, Santa Clara, CA (US); Srinivasa Rao Ponakala, Sunnyvale, CA (US); Myungjong Kim, Milpitas, CA (US); Taeyeon Ki, Milpitas, CA (US); Vijendra Raj Apsingekar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 18/297,509

(22) Filed: Apr. 7, 2023

(65) Prior Publication Data
US 2024/0054999 A1   Feb. 15, 2024

Related U.S. Application Data

(60) Provisional application No. 63/396,521, filed on Aug. 9, 2022.

(51) Int. Cl.
  *G10L 15/22* (2006.01)
  *G10L 15/08* (2006.01)
  *G10L 25/51* (2013.01)

(52) U.S. Cl.
  CPC ............. *G10L 15/22* (2013.01); *G10L 15/08* (2013.01); *G10L 25/51* (2013.01); *G10L 2015/088* (2013.01); *G10L 2015/223* (2013.01)

(58) Field of Classification Search
  CPC ...... G06F 3/107; G06F 40/126; G06F 40/237; G06F 40/35; G06F 3/167; G06F 9/54;
  (Continued)

(56) References Cited

U.S. PATENT DOCUMENTS 9,514,753 B2   12/2016   Sharifi et al.
10,192,548 B2   1/2019   Clark et al.
(Continued)

FOREIGN PATENT DOCUMENTS

CN   107622770 A   1/2018
CN   109036412 A   12/2018
(Continued)

OTHER PUBLICATIONS

International Search Report and Written Opinion of the International Searching Authority dated Nov. 20, 2023 in connection with International Patent Application No. PCT/KR2023/011274, 6 pages.
(Continued)

*Primary Examiner* — Gerald Gauthier (57) ABSTRACT

A method includes obtaining an audio input and a location associated with an electronic device. The method also includes generating an audio embedding associated with the audio input. The method further includes determining a first difference between the audio embedding associated with the audio input and an audio embedding associated with a known user. The method also includes determining a second difference between the location associated with the electronic device and a known location associated with the known user. The method further includes generating, using a false trigger mitigation (FTM) system, a probability of the audio input including a false trigger for automatic speech recognition based on the audio input, the first difference, and the second difference. In addition, the method includes determining whether to perform automatic speech recognition based on the probability.

20 Claims, 3 Drawing Sheets

(58) Field of Classification Search
CPC ..... G06T 19/006; G10L 13/033; G10L 15/08;
G10L 15/1815; G10L 15/22; G10L 15/26;
G10L 15/30; G10L 17/00; G10L 25/51;
G10L 2015/088; G10L 2015/223; G10L
15/065; G10L 15/075; G10L 15/16; G10L
15/1822; G10L 15/20; G10L 15/24; G10L
15/32; G10L 17/06; G10L 25/78; H04L
67/12; H04L 51/02; G02B 27/01; G06V
10/82; H04R 3/12

See application file for complete search history.

(56) References Cited

U.S. PATENT DOCUMENTS

| | | | |
|---|---|---|---|
| 10,978,059 | B2 | 4/2021 | Moreno et al. |
| 11,195,522 | B1 | 12/2021 | Makashir et al. |
| 11,200,894 | B2 | 12/2021 | Smith et al. |
| 11,205,420 | B1 | 12/2021 | Fu et al. |
| 11,205,433 | B2 | 12/2021 | Kim et al. |
| 11,562,744 | B1* | 1/2023 | Gao .............. G10L 13/033 |
| 11,710,482 | B2* | 7/2023 | Garcia .............. G10L 15/22 704/275 |
| 12,045,568 | B1* | 7/2024 | Shrivastava ........ G10L 15/1815 |
| 2008/0015858 | A1 | 1/2008 | Bossemeyer, Jr. |
| 2013/0339014 | A1* | 12/2013 | Tang .............. G10L 15/20 704/235 |
| 2015/0081293 | A1* | 3/2015 | Hsu .............. G10L 15/26 704/235 |
| 2015/0310879 | A1* | 10/2015 | Buchanan .............. G10L 17/06 704/235 |
| 2016/0012819 | A1* | 1/2016 | Willett .............. G10L 15/1815 704/240 |
| 2018/0204574 | A1* | 7/2018 | Hart .............. H04R 3/12 |
| 2018/0211669 | A1* | 7/2018 | Corcoran .............. G10L 15/32 |
| 2019/0051299 | A1* | 2/2019 | Ossowski .............. G10L 15/22 |
| 2019/0251963 | A1 | 8/2019 | Li et al. |
| 2019/0295544 | A1* | 9/2019 | Garcia .............. G10L 15/22 |
| 2020/0152175 | A1* | 5/2020 | Dernoncourt ........ G10L 15/075 |
| 2020/0168223 | A1* | 5/2020 | Choi .............. G10L 15/065 |
| 2021/0020162 | A1 | 1/2021 | Griffin et al. |
| 2021/0082431 | A1 | 3/2021 | Zhou |
| 2021/0097982 | A1 | 4/2021 | Nowak-Przygodzki et al. |
| 2021/0097990 | A1* | 4/2021 | Kim .............. G10L 15/1822 |
| 2021/0118440 | A1* | 4/2021 | Peng .............. G06F 16/90332 |
| 2021/0120206 | A1* | 4/2021 | Liu .............. G06F 40/126 |
| 2021/0166692 | A1* | 6/2021 | Mengibar .............. G10L 15/08 |
| 2021/0183392 | A1 | 6/2021 | Lee et al. |
| 2021/0312923 | A1* | 10/2021 | Gaur .............. G10L 15/26 |
| 2021/0350807 | A1* | 11/2021 | Robert Jose ........ G10L 15/1815 |
| 2021/0366491 | A1 | 11/2021 | Heigold et al. |
| 2022/0058433 | A1 | 2/2022 | Han et al. |
| 2022/0068297 | A1 | 3/2022 | Patel et al. |
| 2022/0093098 | A1 | 3/2022 | Samal et al. |
| 2022/0188361 | A1* | 6/2022 | Botros .............. G02B 27/01 |
| 2022/0199079 | A1* | 6/2022 | Hanson .............. H04L 51/02 |
| 2022/0210111 | A1* | 6/2022 | Greenberg .............. H04L 67/12 |
| 2022/0223147 | A1 | 7/2022 | Liang |
| 2022/0284904 | A1* | 9/2022 | Pu .............. G06F 40/35 |
| 2022/0335953 | A1* | 10/2022 | Rikhye .............. G10L 17/06 |
| 2022/0358917 | A1* | 11/2022 | Chaland .............. G06F 3/167 |
| 2022/0366904 | A1* | 11/2022 | Martinson .............. G10L 15/30 |
| 2022/0374605 | A1* | 11/2022 | Sethi .............. G06T 19/006 |
| 2022/0415320 | A1* | 12/2022 | Zheng .............. G06F 40/237 |
| 2023/0117535 | A1* | 4/2023 | Apsingekar .............. G10L 15/22 704/232 |
| 2023/0419952 | A1* | 12/2023 | Desai .............. G06F 40/35 |
| 2023/0419962 | A1* | 12/2023 | Kim .............. G10L 15/22 |
| 2024/0029723 | A1* | 1/2024 | Balasubramanian ... G10L 15/16 |
| 2024/0046924 | A1* | 2/2024 | D'hoore .............. G06V 10/82 |
| 2024/0054156 | A1* | 2/2024 | Vincent .............. G10L 15/22 |
| 2024/0054999 | A1* | 2/2024 | Tseng .............. G10L 15/22 |

FOREIGN PATENT DOCUMENTS

| | | |
|---|---|---|
| CN | 209462276 U | 10/2019 |
| CN | 110556127 A | 12/2019 |
| CN | 111599361 A | 8/2020 |
| CN | 108520743 B | 1/2021 |
| CN | 112634894 A | 4/2021 |
| CN | 111081217 B | 6/2021 |
| CN | 112882394 A | 6/2021 |
| CN | 108320733 B | 1/2022 |
| CN | 114724566 A | 7/2022 |
| WO | 2019233228 A1 | 12/2019 |

OTHER PUBLICATIONS

Desplanques et al., "ECAPA-TDNN: Emphasized Channel Attention, Propagation and Aggregation in TDNN Based Speaker Verification," proceedings of Interspeech 2020, Aug. 10, 2020, 5 pages.

Dighe et al., "Knowledge Transfer for Efficient On-Device False Trigger Mitigation," Audio and Speech Processing (eess.AS), Oct. 20, 2020, 5 pages.

Garg et al., "Streaming Transformer for Hardware Efficient Voice Trigger Detection and False Trigger Mitigation," Interspeech 2021, Aug. 30-Sep. 3, 2021, Brno, Czechia, 5 pages.

Sim et al., "Robust Continuous On-device Personalization for Automatic Speech Recognition," Interspeech 2021, Aug. 30-Sep. 3, 2021, Brno, Czechia, 5 pages.

McGraw et al., "Personalized Speech Recognition on Mobile Devices," Computation and Language (cs.CL), Mar. 11, 2016, 5 pages.

Eskimez et al., "Personalized Speech Enhancement: New Models and Comprehensive Evaluation," Audio and Speech Processing (eess.AS), Oct. 18, 2021, 5 pages.

Balasubramanian et al., "System and Method for Accent-Agnostic Frame-Level Wake Word Detection," U.S. Appl. No. 17/929,280, 57 pages.

Balasubramanian et al., "System and Method for Command Fulfillment Without Wake Word," U.S. Appl. No. 17/937,198, 61 pages.

Kim et al., "System and Method for Speaker Verification for Voice Assistant," U.S. Appl. No. 18/047,609, 55 pages.

Supplementary European Search Report dated Feb. 21, 2025 in connection with European Patent Application No. 23852860.8, 89 pages.

* cited by examiner

CONTEXT-AWARE FALSE TRIGGER MITIGATION FOR AUTOMATIC SPEECH RECOGNITION (ASR) SYSTEMS OR OTHER SYSTEMS

CROSS-REFERENCE TO RELATED APPLICATION AND PRIORITY CLAIM

This application claims priority under 35 U.S.C. § 119(e) to U.S. Provisional Patent Application No. 63/396,521 filed on Aug. 9, 2022. This provisional application is hereby incorporated by reference in its entirety.

TECHNICAL FIELD

This disclosure relates generally to audio processing systems. More specifically, this disclosure relates to context-aware false trigger mitigation for automatic speech recognition (ASR) systems or other systems.

BACKGROUND

An automatic speech recognition (ASR) system is often designed to listen for a user to begin speaking and to recognize a specific word or phrase in a captured user utterance. The specific word or phrase can be used to alert the ASR system of the user's intent to interact with the ASR system. For example, an ASR system may recognize the term "BIXBY" or the phrase "Hey BIXBY" as indicating the user's intent to interact with the ASR system. These specific words or phrases are often referred to as "wake words" or "wake phrases." Once an ASR system determines that a captured user utterance includes a wake word or phrase, the ASR system processes the same user utterance or one or more additional user utterances in order to identify and fulfill at least one user request. These types of ASR systems are often used when implementing digital assistants or other voice-based functions on smartphones and other electronic devices.

SUMMARY

This disclosure relates to context-aware false trigger mitigation for automatic speech recognition (ASR) systems or other systems.

In a first embodiment, a method includes obtaining, using at least one processing device of an electronic device, an audio input and a location associated with the electronic device. The method also includes generating, using the at least one processing device, an audio embedding associated with the audio input. The method further includes determining, using the at least one processing device, a first difference between the audio embedding associated with the audio input and an audio embedding associated with a known user. The method also includes determining, using the at least one processing device, a second difference between the location associated with the electronic device and a known location associated with the known user. The method further includes generating, using the at least one processing device and a false trigger mitigation (FTM) system, a probability of the audio input including a false trigger for automatic speech recognition based on the audio input, the first difference, and the second difference. In addition, the method includes determining, using the at least one processing device, whether to perform automatic speech recognition based on the probability.

In a second embodiment, an electronic device includes at least one processing device configured to obtain an audio input and a location associated with the electronic device. The at least one processing device is also configured to generate an audio embedding associated with the audio input. The at least one processing device is further configured to determine a first difference between the audio embedding associated with the audio input and an audio embedding associated with a known user. The at least one processing device is also configured to determine a second difference between the location associated with the electronic device and a known location associated with the known user. The at least one processing device is further configured to generate, using an FTM system, a probability of the audio input including a false trigger for automatic speech recognition based on the audio input, the first difference, and the second difference. In addition, the at least one processing device is configured to determine whether to perform automatic speech recognition based on the probability.

In a third embodiment, a non-transitory machine readable medium contains instructions that when executed cause at least one processor of an electronic device to obtain an audio input and a location associated with the electronic device. The non-transitory machine readable medium also contains instructions that when executed cause the at least one processor to generate an audio embedding associated with the audio input. The non-transitory machine readable medium further contains instructions that when executed cause the at least one processor to determine a first difference between the audio embedding associated with the audio input and an audio embedding associated with a known user. The non-transitory machine readable medium also contains instructions that when executed cause the at least one processor to determine a second difference between the location associated with the electronic device and a known location associated with the known user. The non-transitory machine readable medium further contains instructions that when executed cause the at least one processor to generate, using an FTM system, a probability of the audio input including a false trigger for automatic speech recognition based on the audio input, the first difference, and the second difference. In addition, the non-transitory machine readable medium contains instructions that when executed cause the at least one processor to determine whether to perform automatic speech recognition based on the probability.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C.
§ 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 4, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, an automatic speech recognition (ASR) system is often designed to listen for a user to begin speaking and to recognize a specific word or phrase in a captured user utterance. The specific word or phrase can be used to alert the ASR system of the user's intent to interact with the ASR system. For example, an ASR system may recognize the term "BIXBY" or the phrase "Hey BIXBY" as indicating the user's intent to interact with the ASR system. These specific words or phrases are often referred to as "wake words" or "wake phrases." Once an ASR system determines that a captured user utterance includes a wake word or phrase, the ASR system processes the same user utterance or one or more additional user utterances in order to identify and fulfill at least one user request. These types of ASR systems are often used when implementing digital assistants or other voice-based functions on smartphones and other electronic devices.

An ASR system often includes a wake detection engine, which can constantly run in the background in order to detect a wake word or phrase and to invoke the ASR system when the wake word or phrase is detected. However, the wake detection engine can make mistakes and falsely trigger the ASR system when a user has no intention of interacting with the ASR system. For example, the wake detection engine may falsely trigger the ASR system in response to audio input from a nearby television or other audio source or in response to someone speaking a word or phrase that is similar to an expected wake word or phrase. One example of the latter is the tendency of the SIRI digital assistant from APPLE INC. to activate when the words "serious" and "seriously" are detected. These false triggers can be costly in terms of processing power and other resources since they force the ASR system to process one or more user utterances that do not need to be processed. This can also violate users' privacy since it allows the ASR system to essentially eavesdrop on conversations that are not directed to the ASR system.

While some attempts have been made to reduce false triggers of an ASR system, these attempts can suffer from various shortcomings. For example, some attempts for reducing false triggers of an ASR system are based solely on processing captured audio data. Unfortunately, these attempts can ignore additional data that might be useful in determining whether a user intends to trigger or interact with an ASR system. Also, some attempts for reducing false triggers of an ASR system can take excessively long periods of time when determining whether a user intends to trigger or interact with an ASR system, such as when a fixed time threshold or a fixed confidence threshold is used to control how much audio data is captured and processed as part of the false trigger detection process. This may allow for an unacceptable amount of time to pass during which the wake detection engine or the ASR system is capturing and processing audio data when there is no user intention to engage or interact with the ASR system, which can fail to adequately address concerns regarding users' privacy.

This disclosure provides various techniques for context-aware false trigger mitigation, which can be used with an ASR system or other system. As described in more detail below, an audio input and a location are obtained, where the location is associated with an electronic device. An audio embedding associated with the audio input is generated, and a first difference between the audio embedding associated with the audio input and an audio embedding associated with a known user is determined. Also, a second difference between the location associated with the electronic device and a known location associated with the known user is determined. A false trigger mitigation (FTM) system is used to determine a probability of the audio input including a false trigger for automatic speech recognition based on the audio input, the first difference, and the second difference. A determination can be made whether to perform automatic speech recognition based on the probability. In some embodiments, automatic speech recognition of the audio input may be initiated in response to determining that the probability of the audio input including the false trigger is below a threshold probability, and one or more actions may be performed or initiated based on a result of the automatic speech recognition.

The FTM system can be configured to use the audio input, the first difference, and the second difference in any suitable manner in order to generate the probability of the audio input including the false trigger. For example, the audio input may be associated with an utterance length that is indicative of a duration of speech contained in the audio input, and the FTM system may be configured to compare the utterance length to a threshold length and increase the probability of the audio input including the false trigger based on how much the utterance length exceeds the threshold length. The FTM system may be configured such that larger differences between the audio embedding associated with the audio input and the audio embedding associated with the known user increase the probability of the audio input including the false trigger. The FTM system may be configured such that larger differences between the location associated with the electronic device and the known location associated with the known user increase the probability of the audio input including the false trigger. In some instances, the known user may represent an enrolled user associated with the electronic device, the audio embedding associated with the known user may represent an audio embedding generated during or after enrollment of the enrolled user, and the known location associated with the known user may represent a location of a home of the enrolled user.

In this way, the disclosed techniques can perform context-aware false trigger mitigation, which allows the disclosed techniques to more effectively identify instances where a user does not intend to invoke or interact with an ASR system or other system. Among other things, the disclosed techniques take into account additional data, such as the user or electronic device's location and the captured speech's length, in determining whether a user intends to trigger an ASR system or other system. Moreover, the disclosed techniques can be used to more rapidly identify instances in which a user does not intend to invoke or interact with an ASR system or other system. This can help to reduce the amount of audio data that is captured and processed, which can increase user privacy and reduce the costly use of ASR systems or other systems. Note that while some embodiments discussed below are described in the context of use of the disclosed techniques with mobile electronic devices such as smartphones, tablet computers, or smartwatches, these are non-limiting examples of how the disclosed techniques may be used. It will be understood that the principles of this disclosure may be implemented in or with any other suitable devices or systems.

Figure 1:
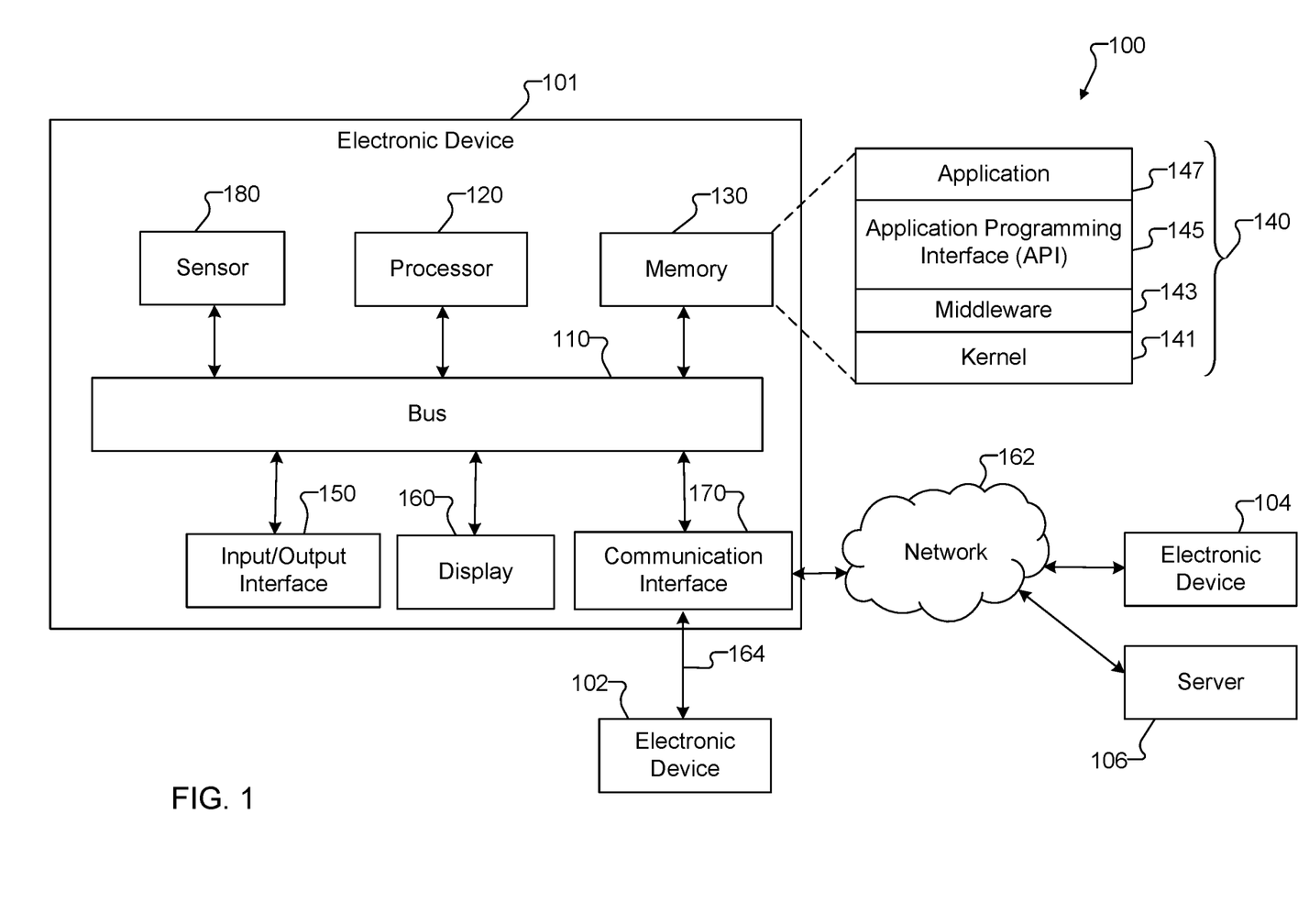
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 can receive and process audio data and location information in order to provide context-aware false trigger mitigation for ASR systems or other systems.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for processing audio data and location information and providing context-aware false trigger mitigation for ASR systems or other systems. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more microphones or other audio sensors, which may be used to capture audio data (including spoken utterances of at least one user). The one or more sensors 180 may also include one or more cameras or other imaging sensors, which may be used to capture images of scenes. The sensor(s) 180 may further include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can receive and process audio data and location information in order to provide context-aware false trigger mitigation for ASR systems or other systems.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
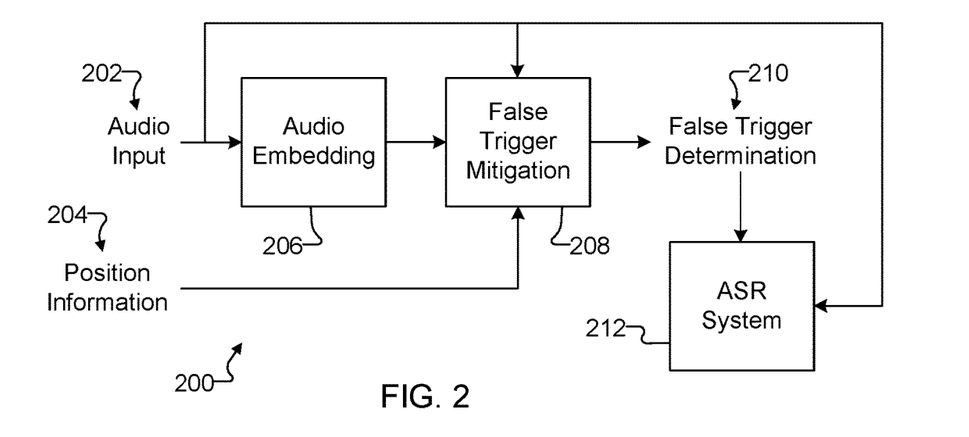
FIGS. 2 and 3 illustrate example architectures supporting context-aware false trigger mitigation for automatic speech recognition (ASR) systems or other systems according to this disclosure.
Figure 3:
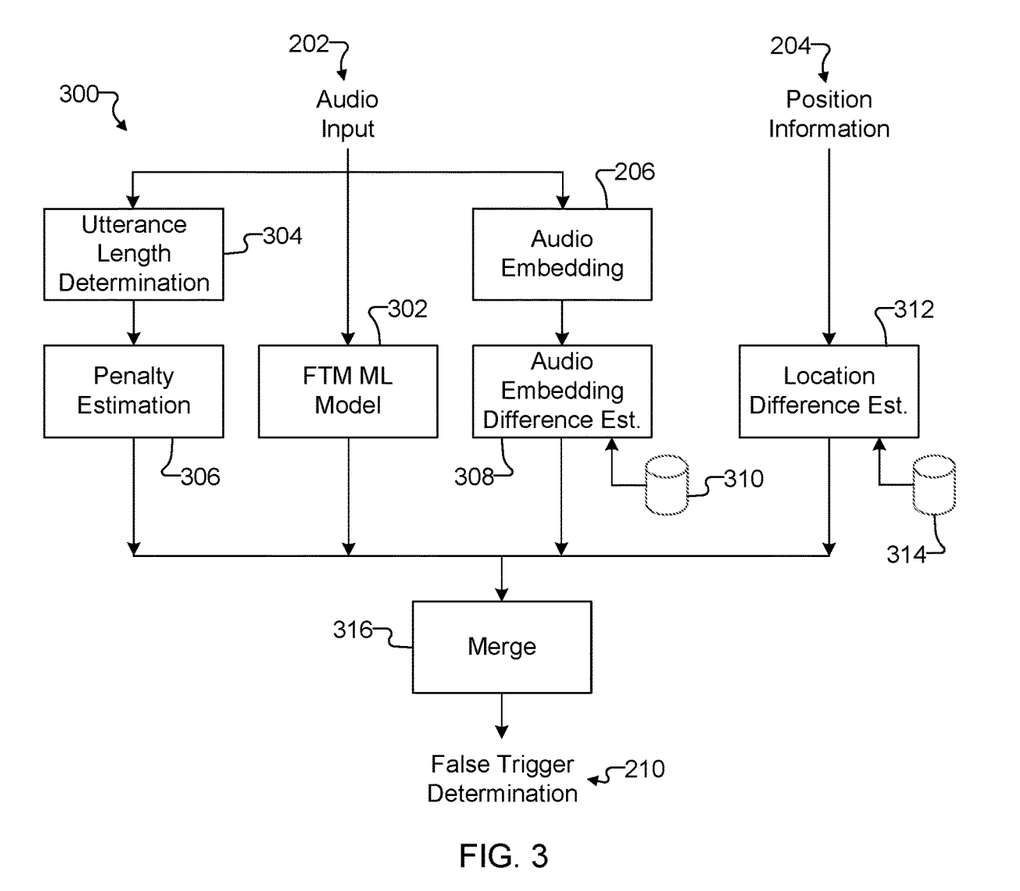

FIGS. 2 and 3 illustrate example architectures 200 and 300 supporting context-aware false trigger mitigation for ASR systems or other systems according to this disclosure. For ease of explanation, the architectures 200 and 300 shown in FIGS. 2 and 3 are described as being implemented on or supported by the electronic device 101 in the network configuration 100 of FIG. 1. However, the architectures 200 and 300 shown in FIGS. 2 and 3 could be used with any other suitable device(s) and in any other suitable system(s).

As shown in FIG. 2, the architecture 200 generally operates to receive and process audio input data 202 and position information 204. The audio input data 202 represents data capturing speech of at least one user or other speaker. For example, the audio input data 202 may represent data captured using one or more audio sensors 180 of the electronic device 101, such as one or more microphones. The audio input data 202 can include utterances made by at least one user of the electronic device 101, as well as other spoken content (such as from other people, televisions, or other audio sources around the electronic device 101) and audio from an ambient environment around the electronic device 101. The audio input data 202 may represent any suitable audio information in any suitable format, such as raw audio segments or normalized or other pre-processed audio segments.

The position information 204 represents information that identifies a location associated with the electronic device 101. For example, the position information 204 may represent global coordinates or other coordinates identifying the location of the electronic device 101. The position information 204 may represent any suitable information defining a location of the electronic device 101. The position information 204 may also be obtained from any suitable source or sources. In some cases, for instance, the position information 204 may be obtained from a navigation system or other system that identifies a location of the electronic device 101 using global positioning system (GPS) or other global navigation satellite system (GNSS) signals, Wi-Fi signals, ultra-wideband (UWB) signals, or other location determination techniques.

The audio input data 202 is provided to an audio embedding function 206, which generally operates to convert the audio input data 202 into corresponding audio embeddings within an embedding space. For example, the audio embedding function 206 may convert the audio input data 202 into one or more audio embeddings, where each audio embedding includes a vector of numerical values. The one or more audio embeddings here can mathematically represent the higher-dimensional features of the audio input data 202 in a lower-dimensional numerical form. Depending on the implementation, each audio embedding generated by the audio embedding function 206 may span any suitable length of time of the audio input data 202 and include any suitable number of numerical values. The audio embedding function 206 may use any suitable technique to generate audio embeddings based on audio input data 202. Various techniques for generating audio embeddings are known in the art, and additional techniques for generating audio embeddings are sure to be developed in the future.

The audio input data 202, the position information 204, and the audio embeddings are provided to a false trigger mitigation (FTM) system 208. The FTM system 208 generally operates to process the audio input data 202, the position information 204, and the audio embeddings in order to identify whether the audio input data 202 appears to contain a false trigger. A false trigger refers to audio input data 202 or at least one characteristic of the audio input data 202 that might incorrectly trigger the use of automatic speech recognition. For example, the FTM system 208 may operate to determine whether the audio input data 202 appears to contain audio that is similar to a wake word or phrase or otherwise contains audio that is not intended to trigger the use of automatic speech recognition.

The FTM system 208 can use various techniques to identify whether the audio input data 202 appears to contain a false trigger. For example, the FTM system 208 may use a trained machine learning model or other logic to generate an initial probability or other prediction as to whether the audio input data 202 contains a false trigger. The FTM system 208 can also identify or otherwise obtain an utterance length that is indicative of a duration of speech that is contained in the audio input data 202. Depending on the implementation, the FTM system 208 may identify the utterance length itself or receive the utterance length from another component of the electronic device 101. The FTM system 208 can use the utterance length to modify the probability or other prediction as to whether the audio input data 202 contains a false trigger. For instance, the FTM system 208 may compare the utterance length to a threshold length and increase the probability of the audio input data 202 containing the false trigger based on how much the utterance length exceeds the threshold length. Effectively, the FTM system 208 can implement a penalty based on the utterance length, where the penalty increases the likelihood of a false trigger being sensed as the utterance length increases. This can be based on the assumption that user utterances not intended for use by a digital assistant or other ASR system tend to be longer (and possibly much longer) than user utterances intended for use by the digital assistant or other ASR system. As a particular example, user utterances intended for use by a digital assistant or other ASR system may be about 3.7 seconds in duration on average, while user utterances not intended for use by a digital assistant or other ASR system may be about 6.4 seconds in duration. Thus, the threshold length may be set to a suitable value (such as between about 3.7 seconds to about 6.4 seconds) in order to differentiate between the two types of user utterances. Note that the specific durations given here are examples only and do not limit the scope of this disclosure. In some cases, the threshold length used here may be determined heuristically.

The FTM system 208 can also identify or otherwise obtain first differences between audio embeddings associated with the audio input data 202 and audio embeddings associated with at least one known user of the electronic device 101. The FTM system 208 can use the first differences to modify the probability or other prediction as to whether the audio input data 202 contains a false trigger. For instance, the FTM system 208 may increase the probability of the audio input data 202 containing the false trigger as the first differences become larger. As a result, larger differences between the audio embeddings associated with the audio input data 202 and the audio embeddings associated with the known user(s) increase the probability of the audio input data 202 including the false trigger. Effectively, the FTM system 208 can implement a penalty based on the first differences, where the penalty increases the likelihood of a false trigger being sensed as the first differences increase. This can be based on the assumption that commands for the electronic device 101 or other interactions with an ASR system are more likely (and possibly far more likely) to originate from a known user associated with the electronic device 101. Note that the first differences here can represent the differences between different audio embeddings, which may be calculated in any suitable manner. In some cases, the first differences may be calculated using cosine similarities or other mathematical measures of similarities between embedding vectors.

The FTM system 208 can further identify or otherwise obtain second differences between the location of the electronic device 101 as identified using the position information 204 and one or more known locations associated with at least one known user of the electronic device 101. The FTM system 208 can use the second differences to modify the probability or other prediction as to whether the audio input data 202 contains a false trigger. For instance, the FTM system 208 may increase the probability of the audio input data 202 containing the false trigger as the second differences become larger. As a result, larger differences between the location of the electronic device 101 and the known location(s) associated with at least one known user increase the probability of the audio input data 202 including the false trigger. Effectively, the FTM system 208 can implement a penalty based on the second differences, where the penalty increases the likelihood of a false trigger being sensed as the second differences increase. This can be based on the assumption that certain commands for the electronic device 101 or other interactions with an ASR system are more likely (and possibly far more likely) to occur when the electronic device 101 is at the home or other known location of a known user. Note that the second differences here can represent the distances between different locations, which may be calculated in any suitable manner. In some cases, the second differences may be calculated as absolute geographical distances between different locations.

In the above description, a "known user" may represent a user that is enrolled with the electronic device 101 or that is otherwise an identifiable user of the electronic device 101. For example, a user may sometimes undergo an enrollment process where the user speaks or otherwise interacts with the electronic device 101 so that the electronic device 101 learns how to recognize that particular user. During the enrollment process or afterwards, the electronic device 101 can typically identify specific audio inputs from that user, identify audio embeddings for those audio inputs, and cluster the audio embeddings. In some instances, the electronic device 101 may generate an average audio embedding or identify a centroid of the audio embeddings associated with each enrolled user, and the electronic device 101 may use the average or centroid audio embedding for each enrolled user when identifying the first differences described above. Thus, for instance, the electronic device 101 may determine smaller first differences when the audio input data 202 comes from a known user (since the resulting audio embeddings will be closer to the audio embeddings associated with the known user) and larger first differences when the audio input data 202 does not come from a known user.

Similarly, at least one known user may be associated with one or more known locations. For example, before, during, or after an enrollment process, a user may identify his or her home address, work address, or other known location(s) associated with the user. In some instances, the electronic device 101 may use the user's home address or other address when identifying the second differences described above. Thus, for instance, the electronic device 101 may determine smaller second differences when the electronic device 101 is at or near the home of a known user and larger second differences when the electronic device 101 is not at or near the home of a known user.

In this example, the FTM system 208 generates false trigger determinations 210 as outputs, where each false trigger determination 210 represents a decision by the FTM system 208 as to whether corresponding audio input data 202 might include a false trigger. Each false trigger determination 210 may be expressed in any suitable manner, such as a probability or other numerical value identifying the likelihood of a false trigger being present or a label indicating the determination of whether a false trigger may be present (possibly in terms of high, medium, or low likelihood or in terms of likely/yes or unlikely/no). Note, however, that the false trigger determinations 210 may be expressed in any other suitable manner.

The false trigger determinations 210 may be used in any suitable manner depending on the implementation. In this particular example, the false trigger determinations 210 are used to control whether an ASR system 212 processes the corresponding audio input data 202 (or the audio embeddings of the audio input data 202). For example, the ASR system 212 may be used to process audio input data 202 or audio embeddings of the audio input data 202 and perform automatic speech recognition when the false trigger determination 210 for that audio input data 202 is below a threshold probability. After the ASR system 212 performs automatic speech recognition, one or more actions may be performed or performance of the one or more actions may be initiated based on the results of the automatic speech recognition. As an example, the ASR system 212 may process the audio input data 202 or the audio embeddings of the audio input data 202 and recognize a user intent, and the ASR system 212 or other logic of the electronic device 101 may determine one or more actions to be performed that can satisfy the user intent. The electronic device 101 can perform the one or more actions itself or cause at least one other device to perform the one or more actions.

As shown in FIG. 3, the architecture 300 generally represents the architecture 200 along with a specific implementation of the FTM system 208. In this example, the audio input data 202 is provided to an FTM machine learning (ML) model 302. The FTM machine learning model 302 represents a trained machine learning model that is trained to process the audio input data 202 and generate an initial probability or other prediction as to whether the audio input data 202 contains a false trigger. The FTM machine learning model 302 represents any suitable machine learning model structure that is trained to estimate whether audio input data 202 contains a wake word or phrase or contains a false trigger. The FTM machine learning model 302 can also be trained in any suitable manner, such as by training the FTM machine learning model 302 using labeled audio data with annotations that indicate whether the audio data does or does not contain a wake word or phrase. This allows the FTM machine learning model 302 to learn to generate initial probabilities or other predictions as to whether the audio input data 202 contains a false trigger. In particular embodiments, the FTM machine learning model 302 may be implemented using the approaches described in U.S. patent application Ser. No. 17/929,280 filed on Sep. 1, 2022 (which is hereby incorporated by reference in its entirety). Note, however, that any other suitable technique may be used to generate probabilities or other predictions as to whether audio input data 202 contains a false trigger.

The audio input data 202 is also provided to an utterance length determination function 304, which generally operates to estimate an utterance length associated with the audio input data 202. The utterance length identifies or otherwise indicates a duration of speech that is contained in the audio input data 202. For example, the utterance length may identify or represent the total amount of time that someone is speaking within the audio input data 202 or that otherwise identifies the length of time that speech is captured within the audio input data 202. The utterance length determination function 304 may use any suitable technique to identify the utterance length. For instance, the utterance length determination function 304 may use any suitable speech detection process in order to detect speech and to distinguish speech from other audible noises captured in the audio input data 202, such as through the use of voice activity detection.

Various techniques for speech detection are known in the art, and additional techniques for speech detection are sure to be developed in the future.

Each utterance length for audio input data 202 is provided to a penalty estimation function 306, which generally operates to determine a penalty (if any) to be applied during calculation of the associated false trigger determination 210 based on whether (and to what extent) the utterance length exceeds a threshold length. For example, the penalty estimation function 306 may apply no penalty when the utterance length of the audio input data 202 is shorter than the threshold length. The penalty estimation function 306 may also apply a penalty when the utterance length of the audio input data 202 is longer than the threshold length, and the penalty can increase (linearly or non-linearly) as the utterance length exceeds the threshold length by larger and larger amounts. This penalty thereby makes it more likely that the false trigger determination 210 will indicate that a false trigger is present as the utterance length of the audio input data 202 exceeds the threshold length by larger and larger amounts. As noted above, this is based on the assumption that user interactions with a digital assistant or other ASR system tend to be shorter in duration. Note, however, that this may or may not always be the case, and there may be some instances where this penalty may not be needed.

The audio input data 202 is further provided to the audio embedding function 206, which generates audio embeddings associated with the audio input data 202 as described above. The audio embeddings associated with the audio input data 202 are provided to an audio embedding difference estimation function 308, which generally operates to determine a penalty (if any) to be applied during calculation of the associated false trigger determination 210 based on whether (and to what extent) the audio embeddings associated with the audio input data 202 differ from audio embeddings 310 associated with one or more known users. For example, as described above, the audio embeddings 310 can be generated and stored, such as during or after an enrollment process for at least one known user. The audio embedding difference estimation function 308 can determine the differences (such as the cosine similarities) between the audio embeddings associated with the audio input data 202 and the audio embeddings 310 associated with the known user(s). As described below, little or no penalty may be applied if the audio embeddings associated with the audio input data 202 are the same as or similar to the audio embeddings 310 associated with a known user. A penalty may be applied if the audio embeddings associated with the audio input data 202 are dissimilar to the audio embeddings 310 associated with the known user(s), and the size of the penalty may increase (linearly or non-linearly) as the differences between the audio embeddings associated with the audio input data 202 and the audio embeddings 310 associated with one or more known users increase. This penalty thereby makes it more likely that the false trigger determination 210 will indicate that a false trigger is present as it becomes more and more likely that a non-enrolled or otherwise unknown user provided an utterance contained in the audio input data 202.

The position information 204 is provided to a location difference estimation function 312, which generally operates to determine a penalty (if any) to be applied during calculation of the associated false trigger determination 210 based on whether (and to what extent) the location of the electronic device 101 differs from at least one known location 314 associated with one or more known users. For example, as described above, each known user may have one or more associated known locations 314, such as a home location and a work location. The location difference estimation function 312 can determine the differences (such as the geographic distances) between the location of the electronic device 101 and the at least one known location 314 associated with one or more known users. As described below, little or no penalty may be applied if a distance is smaller or less than a specified distance threshold. A penalty may be applied if a distance is larger or greater than a specified distance threshold, and the size of the penalty may increase (linearly or non-linearly) as the distance increases. This penalty thereby makes it more likely that the false trigger determination 210 will indicate that a false trigger is present as it becomes more and more likely that an utterance was received at a location where a command or other input from a user involving the ASR system 212 is unlikely to be received.

A merge function 316 generally operates to combine each initial probability or other prediction as generated by the FTM machine learning model 302 with the outputs of the functions 306, 308, 312 in order to generate the associated false trigger determination 210. For example, the merge function 316 can increase the probability or other prediction as generated by the FTM machine learning model 302 based on the penalty as determined using the penalty estimation function 306, which allows the probability or other prediction to increase as the utterance length of the audio input data 202 increases. The merge function 316 can also increase the probability or other prediction as generated by the FTM machine learning model 302 based on a difference as determined using the audio embedding difference estimation function 308, which allows the probability or other prediction to increase as the difference between the audio embeddings associated with the audio input data 202 and the audio embeddings 310 associated with the known user(s) increases. The merge function 316 can further increase the probability or other prediction as generated by the FTM machine learning model 302 based on the difference as determined using the location difference estimation function 312, which allows the probability or other prediction to increase as the distance between the location of the electronic device 101 and the known location(s) 314 of the known user(s) increases.

In some embodiments, the merge function 316 may use the following equation to generate each false trigger determination 210.

$$p(Y'|X) = p(Y|X) * (\alpha_0^{max(0,|Y|-T)/\beta_0} + \alpha_1^{|U_{embed}-E_{embed}|/\beta_1} + \alpha_2^{|U_{loc}-E_{loc}|/\beta_2})$$

Here, $p(Y'|X)$ represents the probability of the audio input data 202 including a false trigger, meaning $p(Y'|X)$ may represent the final value of the false trigger determination 210. Also, $p(Y|X)$ represents an initial probability of the audio input data 202 including a false trigger, meaning $p(Y|X)$ may represent the initial probability or other prediction as generated by the FTM machine learning model 302. Further, $\alpha_0^{max(0,|Y|-T)/\beta_0}$ represents a penalty associated with the utterance length as determined using the penalty estimation function 306, $\alpha_1^{|U_{embed}-E_{embed}|/\beta_1}$ represents a penalty as determined using the audio embedding difference estimation function 308, and $\alpha_2^{|U_{loc}-E_{loc}|/\beta_2}$ represents a penalty as determined using the location difference estimation function 312. In this example, $|Y|$ represents the utterance length associated with the audio input data 202, T represents a threshold length, and $\alpha_0$ and $\beta_0$ represent tunable parameters associated with the utterance length. Also, in this example, $U_{embed}$ represents the audio embedding associated with the audio input data 202, $E_{embed}$ represents the audio embedding 310 associated with a known user, and $\alpha_1$ and $\beta_1$ represent tunable parameters associated with a difference as determined using the audio embedding difference estimation function 308. In addition, in this example, $U_{loc}$ represents the location associated with the electronic device 101, $E_{loc}$ represents a known location 314 associated with a known user, and $\alpha_2$ and $\beta_2$ represent tunable parameters associated with a difference as determined using the location difference estimation function 312. Note that while this is one specific example of how the merge function 316 may operate, other embodiments of the merge function 316 may take different approaches.

These types of architectures 200, 300 may be used to identify false triggers in audio input data 202 under a variety of circumstances. As one example, a user of an electronic device 101 may be speaking with someone and say "I think BIXBY is a valuable addition to SAMSUNG phones." Under normal circumstances, a wake detection engine might detect the wake word "BIXBY" and falsely wake up the ASR system 212. The architectures 200, 300 here may determine (based on the output of the FTM machine learning model 302) that the utterance is not directed to a digital assistant or other ASR system 212 and may reject the utterance (via the false trigger determination 210).

As a second example, a user of an electronic device 101 may be speaking with someone at a public location and say "Hey, tell Billy to turn on the TV." The FTM machine learning model 302 might initially indicate that this is a command for a digital assistant or other ASR system 212 to turn on a television owned by or associated with the user. However, the location difference estimation function 312 may determine that the electronic device 101 is located far from the user's home, which is where the user might ordinarily ask to turn on his or her television. The architectures 200, 300 here may determine (based on the output from the location difference estimation function 312) that the utterance is not directed to a digital assistant or other ASR system 212 and may reject the utterance (via the false trigger determination 210).

As a third example, a user of an electronic device 101 may be speaking with someone and say "BIXBY compared to GOOGLE is 100 times better. I think in terms of contact domain recognition it is doing way better. I also like that it has very user-friendly capsule APIs." The FTM machine learning model 302 might initially indicate that this is a command for a digital assistant or other ASR system 212 since it includes a wake word "BIXBY." However, the penalty estimation function 306 may determine that the utterance length associated with the audio input data 202 for this utterance exceeds the threshold length. The architectures 200, 300 here may determine (based on the output from the penalty estimation function 306) that the utterance is not directed to a digital assistant or other ASR system 212 and may reject the utterance (via the false trigger determination 210).

As a fourth example, a microphone of an electronic device 101 may capture audio played by a television in the background. The captured audio from the television might actually include a command, such as when an advertisement for a mobile device or other product includes a command that could be recognized by the electronic device 101. Here, the FTM machine learning model 302 might initially indicate that this is a command for a digital assistant or other ASR system 212. However, the audio embedding difference estimation function 308 may determine that the audio embedding for the audio input data 202 of the television's audio is not similar to the audio embedding of any known user. The architectures 200, 300 here may determine (based on the output from the audio embedding difference estimation function 308) that the utterance is not directed to a digital assistant or other ASR system 212 and may reject the utterance (via the false trigger determination 210).

As can be seen here, the architectures 200 and 300 provide mechanisms for adjusting the probabilities or other predictions regarding whether an input utterance should be processed by an ASR system 212 or other system. This can be done by incorporating the consideration of data beyond simply the contents of the audio data itself, such as through considerations of factors like utterance lengths, electronic device locations, and similarities to known user audio embeddings. Moreover, this can be done rapidly and reduce or prevent audio data from being provided to the ASR system 212 or other system, which can help to significantly improve user privacy.

It should be noted that the functions shown in or described with respect to FIGS. 2 and 3 can be implemented in an electronic device 101, 102, 104 or other device in any suitable manner. For example, in some embodiments, at least some of the functions shown in or described with respect to FIGS. 2 and 3 can be implemented or supported using one or more software applications or other software instructions that are executed by the processor 120 of the electronic device 101, 102, 104 or other device. In other embodiments, at least some of the functions shown in or described with respect to FIGS. 2 and 3 can be implemented or supported using dedicated hardware components. In general, the functions shown in or described with respect to FIGS. 2 and 3 can be performed using any suitable hardware or any suitable combination of hardware and software/firmware instructions.

Although FIGS. 2 and 3 illustrate examples of architectures 200 and 300 supporting context-aware false trigger mitigation for ASR systems or other systems, various changes may be made to FIGS. 2 and 3. For example, various components and functions shown in FIGS. 2 and 3 may be combined, further subdivided, replicated, omitted, or rearranged and additional components or functions may be added according to particular needs. As a particular example, in FIG. 3, it is assumed that the FTM machine learning model 302 generates an initial probability or other prediction that is modified using any penalties determined using the functions 306, 308, 312. However, the FTM machine learning model 302 may itself be trained to identify and apply penalties or to otherwise generate probabilities or other predictions that consider the same factors as the functions 306, 308, 312. In addition, while utterance lengths, audio embedding differences, and distance differences are used here to produce false trigger determinations 210, any suitable subset of these characteristics may be used in the architectures 200 and 300.

Figure 4:
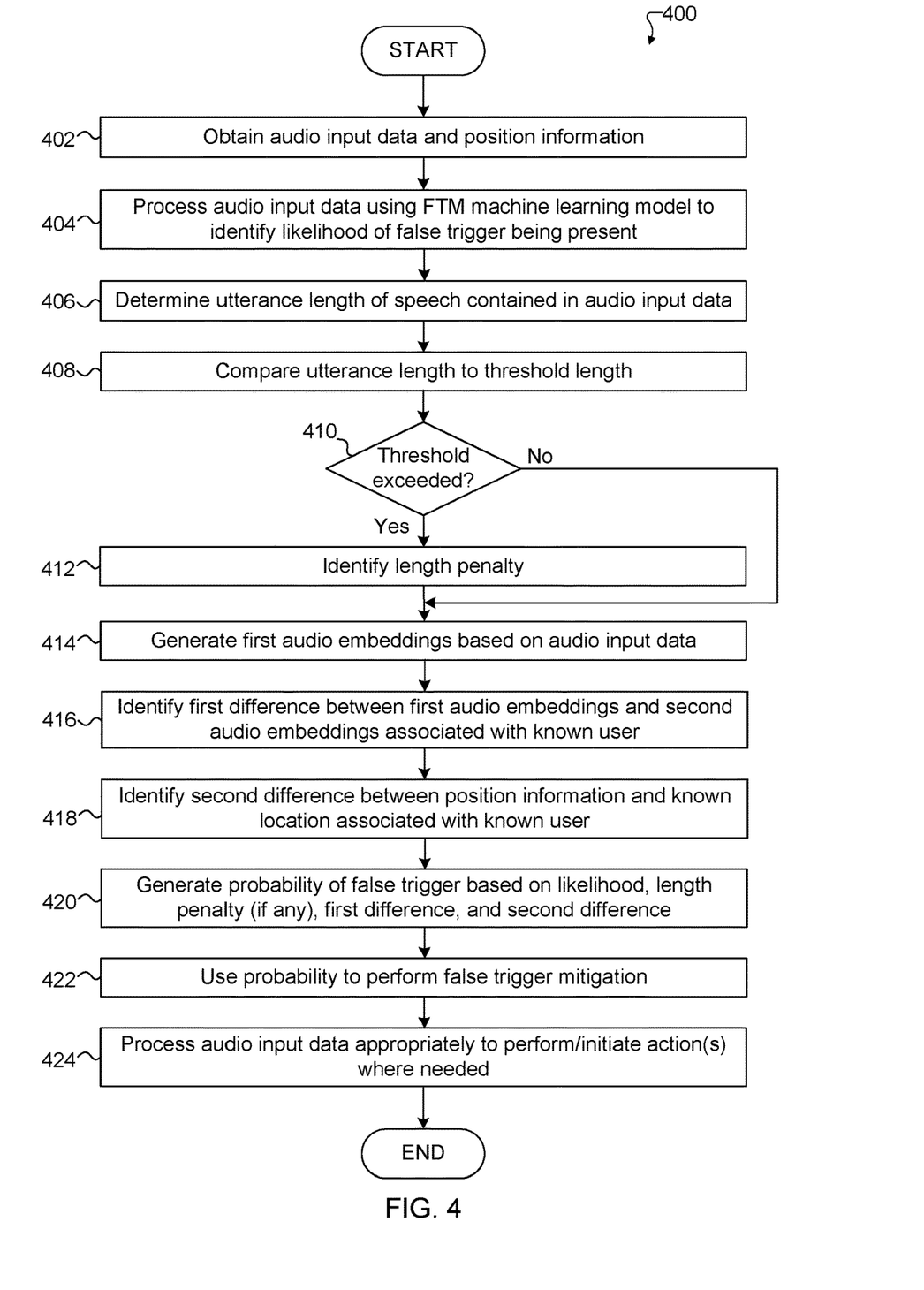
FIG. 4 illustrates an example method for context-aware false trigger mitigation for ASR systems or other systems according to this disclosure.

FIG. 4 illustrates an example method 400 for context-aware false trigger mitigation for ASR systems or other systems according to this disclosure. For ease of explanation, the method 400 shown in FIG. 4 is described as being performed using the electronic device 101 in the network configuration 100 of FIG. 1, where the electronic device 101 may support the architecture 200 of FIG. 2 or the architecture 300 of FIG. 3. However, the method 400 shown in FIG. 4 could be performed using any other suitable device(s) and any other suitable architecture(s) and in any other suitable system(s).

As shown in FIG. 4, audio input data and position information are obtained at step 402. This may include, for example, the processor 120 of the electronic device 101 obtaining audio input data 202, such as by using one or more microphones or other audio sensors 180 of the electronic device 101. This may also include the processor 120 of the electronic device 101 obtaining the position information 204, such as by using a GPS/GNSS receiver, Wi-Fi transceiver, or UWB receiver. In general, the audio input data 202 may be captured or otherwise obtained from any suitable source(s), and the position information 204 may be calculated or otherwise obtained using any suitable technique(s).

The audio input data is processed using an FTM machine learning model to identify an initial likelihood of the audio input data containing a false trigger at step 404. This may include, for example, the processor 120 of the electronic device 101 providing the audio input data 202 to the FTM machine learning model 302. The FTM machine learning model 302 can be trained to process the audio input data 202 and generate an initial probability or other prediction as to whether the audio input data 202 contains a false trigger. Note that the audio input data 202 may be filtered or otherwise pre-processed in any suitable manner prior to being analyzed by the FTM machine learning model 302.

An utterance length of speech contained in the audio input data is determined at step 406 and compared to a threshold length at step 408. This may include, for example, the processor 120 of the electronic device 101 providing the audio input data 202 to the utterance length determination function 304, which can determine an utterance length indicative of a duration of speech contained in the audio input data 202. This may also include the processor 120 of the electronic device 101 providing the utterance length to the penalty estimation function 306, which can compare the utterance length to the threshold length. A determination is made whether the utterance length exceeds the threshold length at step 410. If so, a length penalty is identified at step 412. This may include, for example, the processor 120 of the electronic device 101 using the penalty estimation function 306 to identify a magnitude of the penalty when the utterance length exceeds the threshold length.

One or more first audio embeddings based on the audio input data are generated at step 414. This may include, for example, the processor 120 of the electronic device 101 providing the audio input data 202 to the audio embedding function 206, which converts the audio input data 202 into one or more corresponding audio embeddings. A first difference between the one or more first audio embeddings and one or more second audio embeddings is identified at step 416. This may include, for example, the processor 120 of the electronic device 101 using the audio embedding difference estimation function 308 to identify at least one difference between the one or more first audio embeddings (which are associated with the audio input data 202) and one or more second audio embeddings 310 (which are associated with at least one known user). A second difference between the location of the electronic device and at least one known location of at least one known user is identified at step 418. This may include, for example, the processor 120 of the electronic device 101 using the location difference estimation function 312 to identify at least one difference between the location of the electronic device 101 and at least one known location 314 of at least one known user.

A probability of the audio input data containing a false trigger is generated using the initial likelihood, the penalty (if any), and the first and second differences at step 420. This may include, for example, the processor 120 of the electronic device 101 using the merge function 316 or other logic to modify the initial likelihood if a penalty from the penalty estimation function 306 indicates that the utterance length of the audio input data 202 exceeds the threshold length. This may also include the processor 120 of the electronic device 101 using the merge function 316 or other logic to modify the initial likelihood based on the first difference from the audio embedding difference estimation function 308, such as when a larger penalty is applied for larger values of the first difference. This may further include the processor 20 of the electronic device 101 using the merge function 316 or other logic to modify the initial likelihood based on the second difference from the location difference estimation function 312, such as when a larger penalty is applied for larger values of the second difference. The resulting value may be used as a false trigger determination 210 for the audio input data 202.

The probability of the audio input data containing a false trigger may be used in any suitable manner. In this example, the probability of the audio input data containing a false trigger is used to perform false trigger mitigation at step 422. This may include, for example, the processor 120 of the electronic device 101 refusing to use the ASR system 212 to process the audio input data 202 when the false trigger determination 210 identifies a probability that exceeds a threshold probability. This may also include the processor 120 of the electronic device 101 using the ASR system 212 to process the audio input data 202 when the false trigger determination 210 identifies a probability that is below the threshold probability. In some cases, the audio input data can be processed in order to identify one or more actions to be performed at step 424. This may include, for example, the processor 120 of the electronic device 101 using the ASR system 212 to identify a user intent as expressed in the audio input data 202 and using the ASR system 212 or other logic to identify one or more actions to be performed in order to satisfy the user intent. The processor 120 of the electronic device 101 may itself perform one or more actions and/or may initiate performance of one or more actions by at least one other component (which may be internal or external to the electronic device 101). If the probability of the audio input data 202 containing the false trigger does exceed the probability threshold, the audio input data 202 can be discarded without the ASR system 212 processing the audio input data 202 and without one or more actions being performed or initiated.

Although FIG. 4 illustrates one example of a method 400 for context-aware false trigger mitigation for ASR systems or other systems, various changes may be made to FIG. 4. For example, while shown as a series of steps, various steps in FIG. 4 may overlap, occur in parallel, occur in a different order, or occur any number of times. Also, while utterance lengths, audio embedding differences, and distance differences are used here to produce false trigger determinations 210, any suitable subset of these characteristics may be used in the method 400.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processing device of an electronic device, an audio input and a location, the location associated with the electronic device;
   generating, using the at least one processing device, an audio embedding associated with the audio input;

determining, using the at least one processing device, a first difference between the audio embedding associated with the audio input and an audio embedding associated with a known user;

determining, using the at least one processing device, a second difference between the location associated with the electronic device and a known location associated with the known user;

generating, using the at least one processing device and a false trigger mitigation (FTM) system, a probability of the audio input including a false trigger for automatic speech recognition based on the audio input, the first difference, and the second difference; and determining, using the at least one processing device, whether to perform automatic speech recognition based on the probability.

2. The method of claim 1, wherein the FTM system is configured to compare an utterance length to a threshold length and increase the probability of the audio input including the false trigger based on how much the utterance length exceeds the threshold length, the utterance length indicative of a duration of speech contained in the audio input.

3. The method of claim 1, wherein the FTM system is configured to increase the probability of the audio input including the false trigger based on the first difference such that larger differences between the audio embedding associated with the audio input and the audio embedding associated with the known user increase the probability of the audio input including the false trigger.

4. The method of claim 3, wherein the FTM system is configured to increase the probability of the audio input including the false trigger based on the second difference such that larger differences between the location associated with the electronic device and the known location associated with the known user increase the probability of the audio input including the false trigger.

5. The method of claim 4, wherein:
the known user represents an enrolled user associated with the electronic device;
the audio embedding associated with the known user represents an audio embedding generated during or after enrollment of the enrolled user; and
the known location associated with the known user represents a location of a home of the enrolled user.

6. The method of claim 1, further comprising:
initiating automatic speech recognition of the audio input in response to determining that the probability of the audio input including the false trigger is below a threshold probability; and
performing or initiating performance of one or more actions based on a result of the automatic speech recognition.

7. The method of claim 1, wherein the FTM system generates the probability of the audio input including the false trigger using a formula of:

$$p(Y'|X) = p(Y|X) * (\alpha_0^{max(0,|Y|-T)/\beta_0} + \alpha_1^{|U_{embed}-E_{embed}|/\beta_1} + \alpha_2^{|U_{loc}-E_{loc}|/\beta_2})$$

where:
$p(Y'|X)$ represents the probability of the audio input including the false trigger;
$p(Y|X)$ represents an initial probability of the audio input including the false trigger;
$\alpha_0^{max(0,|Y|-T)/\beta_0}$ represents a penalty associated with an utterance length indicative of a duration of speech contained in the audio input;

$\alpha_1^{|U_{embed}-E_{embed}|/\beta_1}$ represents a penalty associated with the first difference;
$\alpha_2^{|U_{loc}-E_{loc}|/\beta_2}$ represents a penalty associated with the second difference;
$|Y|$ represents the utterance length;
T represents a threshold length;
$\alpha_0$ and $\beta_0$ represent tunable parameters associated with the utterance length;
$U_{embed}$ represents the audio embedding associated with the audio input;
$E_{embed}$ represents the audio embedding associated with the known user;
$\alpha_1$ and $\beta_1$ represent tunable parameters associated with the first difference;
$U_{loc}$ represents the location associated with the electronic device;
$E_{loc}$ represents the known location associated with the known user; and
$\alpha_2$ and $\beta_2$ represent tunable parameters associated with the second difference.

8. An electronic device comprising:
at least one processing device configured to:
obtain an audio input and a location, the location associated with the electronic device;
generate an audio embedding associated with the audio input;
determine a first difference between the audio embedding associated with the audio input and an audio embedding associated with a known user;
determine a second difference between the location associated with the electronic device and a known location associated with the known user;
generate, using a false trigger mitigation (FTM) system, a probability of the audio input including a false trigger for automatic speech recognition based on the audio input, the first difference, and the second difference; and
determine whether to perform automatic speech recognition based on the probability.

9. The electronic device of claim 8, wherein the FTM system is configured to compare an utterance length to a threshold length and increase the probability of the audio input including the false trigger based on how much the utterance length exceeds the threshold length, the utterance length indicative of a duration of speech contained in the audio input.

10. The electronic device of claim 8, wherein the FTM system is configured to increase the probability of the audio input including the false trigger based on the first difference such that larger differences between the audio embedding associated with the audio input and the audio embedding associated with the known user increase the probability of the audio input including the false trigger.

11. The electronic device of claim 10, wherein the FTM system is configured to increase the probability of the audio input including the false trigger based on the second difference such that larger differences between the location associated with the electronic device and the known location associated with the known user increase the probability of the audio input including the false trigger.

12. The electronic device of claim 11, wherein:
the known user represents an enrolled user associated with the electronic device;
the audio embedding associated with the known user represents an audio embedding generated during or after enrollment of the enrolled user; and the known location associated with the known user represents a location of a home of the enrolled user.

13. The electronic device of claim 8, wherein the at least one processing device is further configured to:
   initiate automatic speech recognition of the audio input in response to determining that the probability of the audio input including the false trigger is below a threshold probability; and
   perform or initiate performance of one or more actions based on a result of the automatic speech recognition.

14. The electronic device of claim 8, wherein the FTM system is configured to generate the probability of the audio input including the false trigger using a formula of:

$$p(Y'|X) = p(Y|X) * (\alpha_0^{max(0,|Y|-T)/\beta_0} + \alpha_1^{|U_{embed}-E_{embed}|/\beta_1} + \alpha_2^{|U_{loc}-E_{loc}|/\beta_2})$$

where:
   $p(Y'|X)$ represents the probability of the audio input including the false trigger;
   $p(Y|X)$ represents an initial probability of the audio input including the false trigger;
   $\alpha_0^{max(0,|Y|-T)/\beta_0}$ represents a penalty associated with an utterance length indicative of a duration of speech contained in the audio input;
   $\alpha_1^{|U_{embed}-E_{embed}|/\beta_1}$ represents a penalty associated with the first difference;
   $\alpha_2^{|U_{loc}-E_{loc}|/\beta_2}$ represents a penalty associated with the second difference;
   $|Y|$ represents the utterance length;
   $T$ represents a threshold length;
   $\alpha_0$ and $\beta_0$ represent tunable parameters associated with the utterance length;
   $U_{embed}$ represents the audio embedding associated with the audio input;
   $E_{embed}$ represents the audio embedding associated with the known user;
   $\alpha_1$ and $\beta_1$ represent tunable parameters associated with the first difference;
   $U_{loc}$ represents the location associated with the electronic device;
   $E_{loc}$ represents the known location associated with the known user; and
   $\alpha_2$ and $\beta_2$ represent tunable parameters associated with the second difference.

15. A non-transitory machine readable medium containing instructions that when executed cause at least one processor of an electronic device to:
   obtain an audio input and a location, the location associated with the electronic device;
   generate an audio embedding associated with the audio input;
   determine a first difference between the audio embedding associated with the audio input and an audio embedding associated with a known user;
   determine a second difference between the location associated with the electronic device and a known location associated with the known user;
   generate, using a false trigger mitigation (FTM) system, a probability of the audio input including a false trigger for automatic speech recognition based on the audio input, the first difference, and the second difference; and
   determine whether to perform automatic speech recognition based on the probability.

16. The non-transitory machine readable medium of claim 15, wherein the FTM system is configured to compare an utterance length to a threshold length and increase the probability of the audio input including the false trigger based on how much the utterance length exceeds the threshold length, the utterance length indicative of a duration of speech contained in the audio input.

17. The non-transitory machine readable medium of claim 15, wherein the FTM system is configured to increase the probability of the audio input including the false trigger based on the first difference such that larger differences between the audio embedding associated with the audio input and the audio embedding associated with the known user increase the probability of the audio input including the false trigger.

18. The non-transitory machine readable medium of claim 17, wherein the FTM system is configured to increase the probability of the audio input including the false trigger based on the second difference such that larger differences between the location associated with the electronic device and the known location associated with the known user increase the probability of the audio input including the false trigger.

19. The non-transitory machine readable medium of claim 18, wherein:
   the known user represents an enrolled user associated with the electronic device;
   the audio embedding associated with the known user represents an audio embedding generated during or after enrollment of the enrolled user; and
   the known location associated with the known user represents a location of a home of the enrolled user.

20. The non-transitory machine readable medium of claim 15, further containing instructions that when executed cause the at least one processor to:
   initiate automatic speech recognition of the audio input in response to determining that the probability of the audio input including the false trigger is below a threshold probability; and
   perform or initiate performance of one or more actions based on a result of the automatic speech recognition.

* * * * *